(12) United States Patent
Li et al.

(10) Patent No.: US 12,477,633 B2
(45) Date of Patent: Nov. 18, 2025

(54) POWER CONVERSION CIRCUIT FOR QUICK RESPONSE AND SWITCHING POWER SUPPLY

(71) Applicants: Joulwatt Technology Co., Ltd., Hangzhou (CN); Joulwatt Technology (Shenzhen) Co., Ltd., Shenzhen (CN)

(72) Inventors: Shengfeng Li, Shenzhen (CN); Aimin Xu, Hangzhou (CN); Pitleong Wong, Hangzhou (CN); Zhirong Chen, Shenzhen (CN)

(73) Assignees: Joulwatt Technology Co., Ltd., Hangzhou (CN); Joulwatt Technology (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 18/399,866

(22) Filed: Dec. 29, 2023

(65) Prior Publication Data

US 2024/0224396 A1   Jul. 4, 2024

(30) Foreign Application Priority Data

Dec. 29, 2022 (CN) .......................... 202211705781.5
Dec. 29, 2022 (CN) .......................... 202211705782.X

(51) Int. Cl.
*H05B 45/38* (2020.01)
*H05B 45/325* (2020.01)
*H05B 45/375* (2020.01)

(52) U.S. Cl.
CPC ......... *H05B 45/325* (2020.01); *H05B 45/375* (2020.01); *H05B 45/38* (2020.01)

(58) Field of Classification Search
CPC .... H05B 45/38; H05B 45/325; H05B 45/375; H05B 45/385; H02M 3/1566; H02M 3/1582; H02M 3/1586
See application file for complete search history.

(56) References Cited

U.S. PATENT DOCUMENTS 6,366,070 B1 * 4/2002 Cooke ................. H02M 3/1588
                                                            323/284
7,170,264 B1 * 1/2007 Galinski ............... H02M 3/156
                                                            323/284

(Continued)

FOREIGN PATENT DOCUMENTS

CN    114710012 A    7/2022

*Primary Examiner* — Tung X Le
(74) *Attorney, Agent, or Firm* — IPro, PLLC

(57) ABSTRACT

Disclosed is a power conversion circuit for quick response and a switching power supply, wherein an error compensation signal is obtained according to a sampled signal representing an output feedback signal or an average current through the inductor. A PWM control signal is generated according to the error compensation signal, a ramp signal, and a proportional signal, and is used to control switching operations of a main power switch transistor, the proportional signal is proportional to an input voltage or/and an output voltage, thus the system can quickly respond to transient change of the input voltage or the output signal and provide stable output. Output voltage information or/and input voltage information can be fed back to a control loop, thus the system can quickly obtain a switching duty cycle which allows the system to operate in a state close to steady, and dynamic response speed of the system is fast.

19 Claims, 11 Drawing Sheets

(56) References Cited

U.S. PATENT DOCUMENTS

| | | | | |
|---|---|---|---|---|
| 8,217,637 | B2* | 7/2012 | Tsui | H02M 3/156 |
| | | | | 323/282 |
| 9,899,913 | B2* | 2/2018 | Chang | H02M 3/156 |
| 2014/0354250 | A1* | 12/2014 | Deng | H02M 3/157 |
| | | | | 323/271 |
| 2018/0262107 | A1* | 9/2018 | Raval | H02M 3/158 |
| 2021/0045212 | A1* | 2/2021 | Lai | H05B 45/14 |
| 2021/0336524 | A1* | 10/2021 | Huang | H02M 3/1582 |
| 2023/0034590 | A1* | 2/2023 | Cai | H05B 45/10 |

* cited by examiner

POWER CONVERSION CIRCUIT FOR QUICK RESPONSE AND SWITCHING POWER SUPPLY

CROSS-REFERENCE TO RELATED APPLICATION

This application claims priority to a Chinese patent application No. 202211705781.5, which is filed on Dec. 29, 2022, published as CN116367377A on Jun. 30, 2023, and entitled "SWITCHING POWER SUPPLY FOR DRIVING LED AND CONTROL METHOD", and a Chinese patent application No. 202211705782.X, which is filed on Dec. 29, 2022, and entitled "POWER CONVERSION CIRCUIT WITH QUICK RESPONSE AND CONTROL METHOD THEREOF", the entire contents of which are incorporated by reference in its entirety.

FIELD OF THE DISCLOSURE

The present disclosure relates to a technical field of power electronics, in particular to a power conversion circuit for quick response and a switching power supply.

DESCRIPTION OF THE RELATED ART

In a power conversion circuit, such as a DC power conversion circuit, for making loop control stable, it is necessary to obtain feedback information representing an output signal, and control on and off operations (switching operation) of a power switch transistor by the loop control according to the feedback information, so as to make the output signal stable.

It is expected to improve dynamic response speed of the power conversion circuit, so as to realize rapid stability and rapid adjustment on the output signal.

SUMMARY OF THE DISCLOSURE

In view of this, an objective of the present disclosure is to provide a power conversion circuit for quick response and a switching power supply using the same, to solve a technical problem that the response speed of the power conversion circuit in the prior art is low.

According to an aspect of the present disclosure, a power conversion circuit for quick response is provided. The power conversion circuit has an input terminal receiving an input voltage and an output terminal connected to a load, and comprises a power stage circuit and a control circuit, wherein the power stage circuit comprises a main power switch transistor, a freewheeling switch transistor and an inductor,
wherein the control circuit comprises an error amplification circuit and a PWM control circuit, the error amplification circuit obtains an error compensation signal according to a sampled signal, the sampled signal representing an output feedback signal of the power conversion circuit or representing an average value of a current through the inductor,
wherein the PWM control circuit generates a PWM control signal according to the error compensation signal, a ramp signal, and a proportional signal, the PWM control signal is used for controlling a switching operation of the main power switch transistor, and the proportional signal is proportional to the input voltage or/and an output voltage of the power stage circuit.

In some optional embodiments, the sampled signal represents the output feedback signal of the power conversion circuit, the error amplification circuit is configured to: obtain a first compensation signal according to difference information between the sampled signal and a preset reference signal, and obtain a second compensation signal according to difference information between the first compensation signal and a first current signal representing power loop current information, and the second compensation signal is provided to the PWM control circuit as the error compensation signal.

In some optional embodiments, the PWM control circuit is configured to compare the ramp signal with a sum of the second compensation signal and the proportional signal, to generate the PWM control signal, or the PWM control circuit is configured to compare the second compensation signal with a difference between the ramp signal and the proportional signal, to generate the PWM control signal.

In some optional embodiments, the PWM control circuit comprises: a ramp generation circuit, configured to obtain the ramp signal according to input voltage information or/and output voltage information of the power stage circuit; a signal processing circuit, configured to receive the second compensation signal and the proportional signal, and generate a processed signal by performing superposition processing on the second compensation signal and the proportional signal; and a PWM signal generation circuit, configured to receive the processed signal and the ramp signal and generate the PWM control signal according to the processed signal and the ramp signal.

In some optional embodiments, the first current signal is a signal representing an inductor current of the power stage circuit or a load current of the power stage circuit.

In some optional embodiments, the ramp signal is a sawtooth wave signal or a triangular wave signal.

In some optional embodiments, when a buck power stage circuit is formed by use of the main power switch transistor, the freewheeling switch transistor, and the inductor, a slope of the ramp signal is linearly proportional to a signal representing the input voltage, by a second proportion coefficient; the proportional signal is linearly proportional to a signal representing the output voltage, by a first proportion coefficient; or the proportional signal is linearly proportional to a difference between the signal representing the input voltage and the signal representing the output voltage, by a first proportion coefficient.

In some optional embodiments, an amplitude of the ramp signal is a product of the second proportion coefficient and the signal representing the input voltage.

In some optional embodiments, when a boost power stage circuit is formed by use of the main power switch transistor, the freewheeling switch transistor, and the inductor,
a slope of the ramp signal is linearly proportional to a signal representing the output voltage, by a second proportion coefficient, and an amplitude of the ramp signal is a product of the second proportion coefficient and the signal representing the output voltage;
the proportional signal is linearly proportional to a difference between the signal representing the output voltage and a signal representing the input voltage, or the proportional signal is linearly proportional to the signal representing the input voltage, by a first proportion coefficient.

In some optional embodiments, when a buck-boost power stage circuit is formed by use of the main power switch transistor, the freewheeling switch transistor, and the inductor, a slope of the ramp signal is linearly proportional to a sum of an absolute value of a signal representing the output voltage and a signal representing the input voltage, by a second proportion coefficient, and an amplitude of the ramp signal is a product of the second proportion coefficient and a sum of the absolute value of the signal representing the output voltage and the signal representing the input voltage;

the proportional signal is linearly proportional to the absolute value of the signal representing the output voltage or to the signal representing the input voltage, by a first proportion coefficient.

In some optional embodiments, wherein a signal representing the output voltage is obtained by sampling a feedback signal of the output voltage or by sampling a preset reference signal.

In some optional embodiments, wherein the ramp signal is obtained by charging a charge capacitor with a charging current, and the charging current is associated with input voltage information or/and output voltage information of the power stage circuit.

According to another aspect of the present disclosure, a switching power supply for driving an LED is provided, and includes a power conversion circuit as described in any of the various embodiments of the present disclosure, wherein the control circuit further includes a sampling circuit, configured to sample the output voltage of the power stage circuit to obtain a first proportional voltage signal, which is provided to the PWM control circuit as the proportional signal, wherein the first proportional voltage signal is proportional to the output voltage by a first proportion coefficient;

the sampled signal represents an average value of a current through the inductor, and the error amplification circuit is configured to obtain the error compensation signal according to the sampled signal and a preset reference current.

In some optional embodiments, when the error compensation signal reaches a difference between the ramp signal and the first proportional voltage signal, or when a sum of the error compensation signal and the first proportional voltage signal reaches the ramp signal, the PWM control signal is used to control the power switch transistor to be turned off.

In some optional embodiments, the sampled signal is obtained by sampling the current through the inductor or by sampling a load current of the power conversion circuit.

In some optional embodiments, a slope of the ramp signal is linearly proportional to the input voltage, by a second proportion coefficient.

In some optional embodiments, the first proportion coefficient is equal to the second proportion coefficient.

In some optional embodiments, the sampling circuit is configured to sample the input voltage of the power stage circuit to obtain a second proportional voltage signal which is proportional to the input voltage, and the PWM control circuit comprises: a ramp generation circuit, configured to generate the ramp signal according to the second proportional voltage signal, an amplitude of the ramp signal is a product of the second proportion coefficient and the input voltage; and a PWM signal generation circuit, configured to provide the PWM control signal according to the ramp signal.

In some optional embodiments, the PWM signal generation circuit is configured to compare the ramp signal with a sum of the error compensation signal and the first proportional voltage signal to generate the PWM control signal, or the PWM signal generation circuit is configured to compare the error compensation signal with a difference between the ramp signal and the first proportional voltage signal to generate the PWM control signal.

In some optional embodiments, the PWM signal generation circuit includes a superposition circuit and a comparison circuit, the superposition circuit is configured to receive the error compensation signal and the first proportional voltage signal, the comparison circuit is configured to receive an output signal of the superposition circuit and the ramp signal, and compare the output signal of the superposition circuit with the ramp signal to generate the PWM control signal.

In some optional embodiments, the sampling circuit includes an input voltage sampling circuit and an output voltage sampling circuit, the input voltage sampling circuit is connected with an input terminal of the switching power supply to obtain a second proportional voltage signal, which is proportional to the input voltage by a second proportion coefficient, the output voltage sampling circuit is connected to an output terminal of the switching power supply to obtain a first proportional voltage signal, which is proportional to the output voltage by a first proportion coefficient.

In some optional embodiments, the load includes a lamp string composed of a plurality of LED lamps, and the power conversion circuit is configured to control the plurality of LED lamps to be turned on/off through a switch connected in parallel or/and in series with a corresponding one of the plurality of LED lamps.

It should be noted that the above general description and the following detailed descriptions are exemplary and explanatory only and are not intended to limit the present invention.

BRIEF DESCRIPTION OF THE DRAWINGS

The above and other objects, features and advantages of the present invention will become more apparent from the description below with reference to the accompanying drawings.

DETAILED DESCRIPTION OF EMBODIMENTS OF THE DISCLOSURE

Preferred embodiments of the present disclosure are described in detail below with reference to the accompanying drawings but the present disclosure is not limited to these embodiments. The present disclosure is intended to cover alternatives, modifications, equivalents, and arrangements that are within the spirit and scope of the present disclosure.

In order to provide a thorough understanding of the present disclosure, specific details are set forth in the following descriptions of the preferred embodiments of the present disclosure, and the present disclosure may be fully understood by those skilled in the art without such details.

The present disclosure is described in more detail by way of example in the following paragraphs with reference to the accompanying drawings. It should be noted that the drawings are all in a simplified form and are not precisely drawn to scale, the drawings are only provided to aid in describing the embodiments of the present disclosure conveniently and clearly.

In a conventional feedback control solution, an error amplifier is usually used for performing error amplification on an output feedback signal and a reference signal, and then a comparator is used to compare a signal, which is obtained by the error amplification, with a sawtooth signal, so as to generate a switching control signal to control switching operations of main power switch transistor in the power conversion circuit, thus controlling an output of the power conversion circuit to be stable. However, dynamic response of this kind of control method is slow, for example, if a transient change occurs on the input voltage or the output voltage, the output cannot be adjusted quickly because the response speed of the error amplifier is slow and the change cannot be quickly reflected on the switching duty cycle, thus the output cannot be adjusted quickly.

According to the technical proposal of the present disclosure, output voltage information or/and input voltage information can be fed back to a control loop, so that variation information of the input voltage and the output voltage can be quickly reflected by the PWM control signal, thus the system can quickly obtain a switching duty cycle which allows the system to operate in a state close to steady, thereby the output voltage can be controlled to be stable, and dynamic response speed of the system can be fast.

Figure 1:
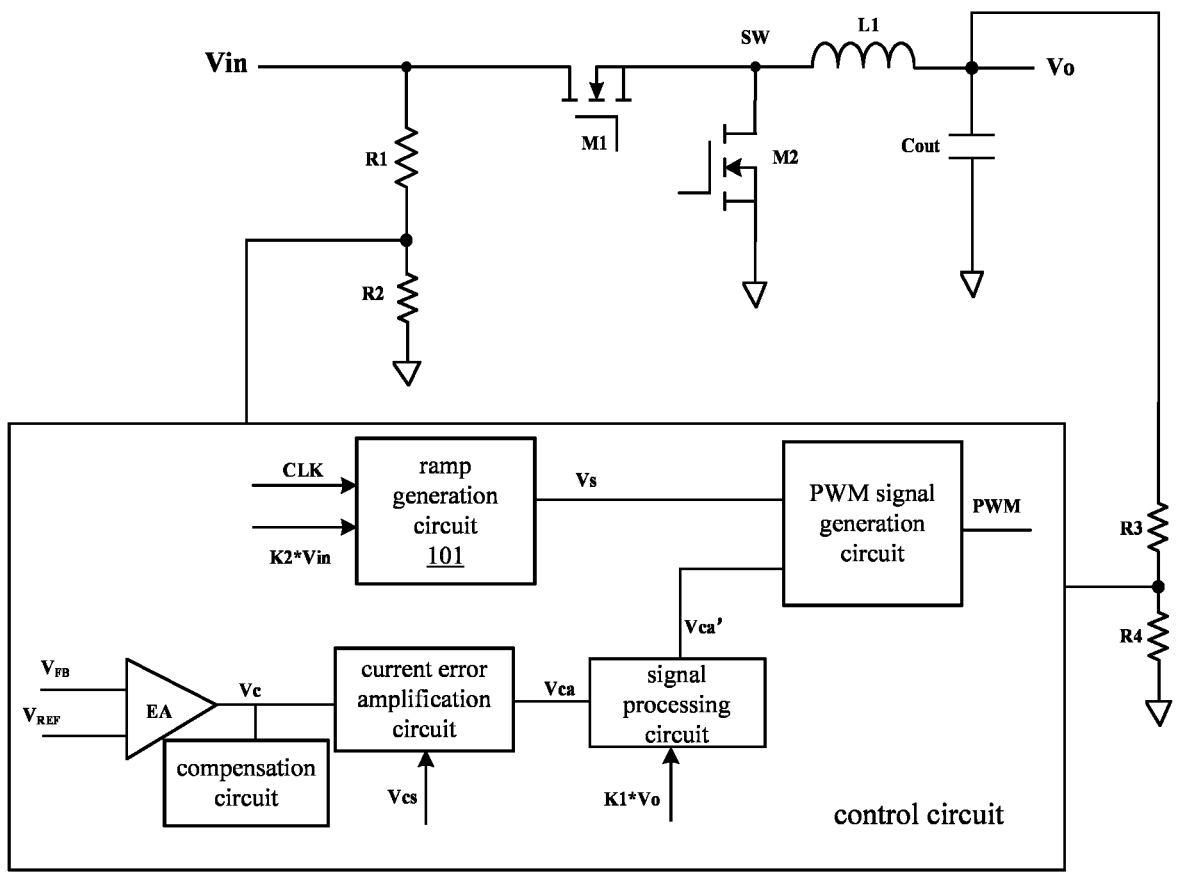
FIG. 1 is a circuit block diagram of a power conversion circuit according to a first embodiment of the present disclosure.
Figure 2:
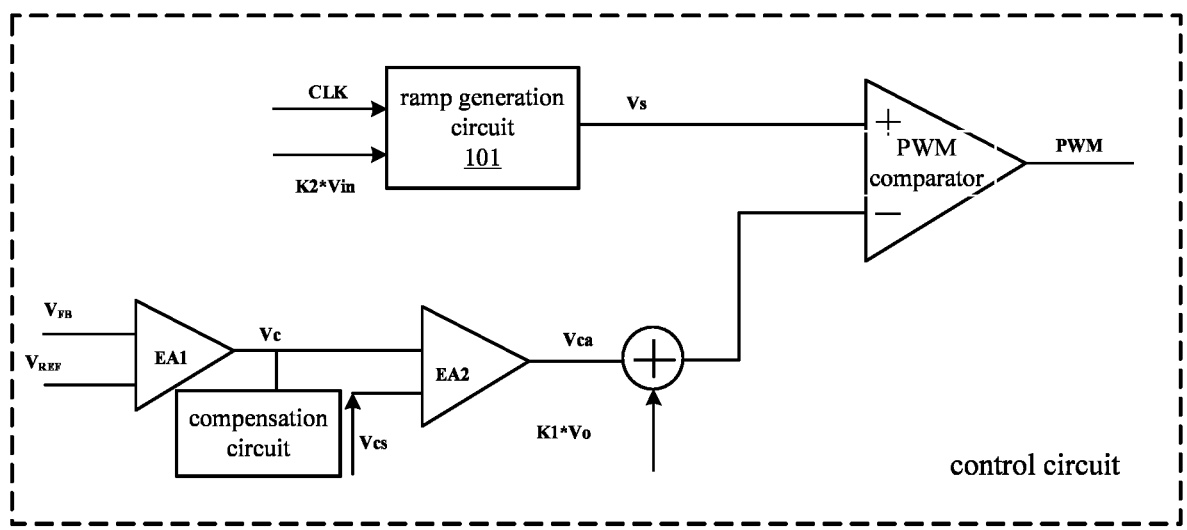
FIG. 2 is a schematic circuit diagram of the control circuit according to FIG. 1.
Figure 3:
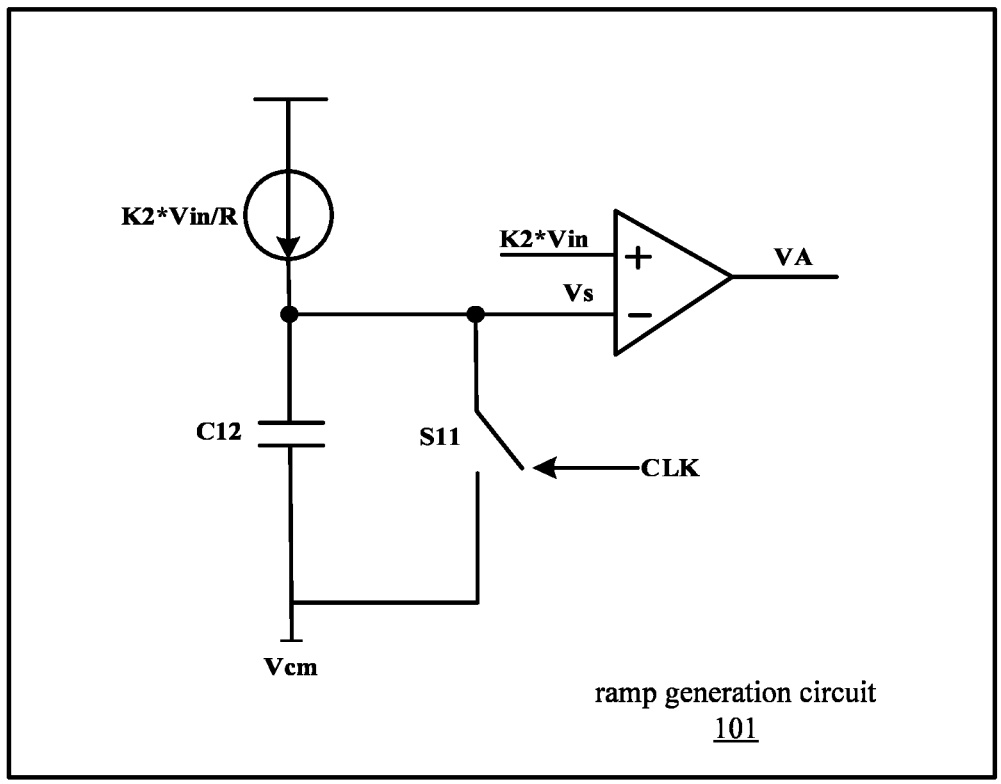
FIG. 3 is a schematic circuit diagram of the ramp generation circuit according to FIG. 1.

FIG. 1 is a circuit block diagram of a power conversion circuit according to a first embodiment of the present disclosure, FIG. 2 is a schematic circuit diagram of a control circuit according to FIG. 1, and FIG. 3 is a schematic circuit diagram of a ramp generation circuit according to FIG. 1. As shown in FIGS. 1 and 2, in this example, the power conversion circuit may be a buck power conversion circuit comprising a switch transistor M1, a switch transistor M2 and an inductor L1, an input terminal of the power conversion circuit receives an input voltage Vin, and an output terminal of the power conversion circuit provides an output voltage Vo for driving a load.

As shown in FIG. 1, a control circuit includes an error amplification circuit and a PWM control circuit, the error amplification circuit is configured to obtain a first compensation signal according to difference information between a preset reference signal and a sampled signal representing an output feedback signal of the power conversion circuit, and obtain a second compensation signal (as an error compensation signal supplied to the PWM control circuit) according to difference information between the first compensation signal and a first current signal representing power loop current information. As shown in FIG. 2, the error amplification circuit includes a voltage error amplification circuit (such as a first error amplifier EA1) and a current error amplification circuit (such as a second error amplifier EA2). The first error amplifier EA1 may be configured to perform error amplification between the preset reference signal and a sampled signal representing the output feedback signal of the power conversion circuit, and then the first compensation signal Vc can be obtained by use of a compensation circuit which is connected at an output terminal of the first error amplifier EA1. The second error amplifier EA2 may be configured to perform error amplification between the first compensation signal Vc and the first current signal Vcs representing power loop current information, and then the second compensation signal Vca can be obtained by use of a compensation circuit (not shown in the figure) which is connected at an output terminal of the second error amplifier EA2. The first current signal Vcs represents an inductor current signal of the power stage circuit or a load current signal of the power stage circuit, and different current signals can be selected in different topologies or situations to obtain faster response and feedforward.

In an example, the PWM control circuit may include a ramp generation circuit (101) and a PWM signal generation circuit. The ramp generation circuit is configured to obtain a ramp signal according to input voltage information or/and output voltage information of the power stage circuit, and the PWM signal generation circuit, as shown in FIG. 3, may be configured to operate in accordance with a charging current K2*Vin/R, which is proportional to the input voltage information or/and the output voltage information and charges a charge capacitor to generate the ramp signal at one end of the charge capacitor. In this example, a slope of the ramp signal is linearly proportional to the signal representing the input voltage, by a second proportion coefficient, i.e., Vs=K2*Vin, where an amplitude of the ramp signal is set to K2*Vin, that is, when the ramp signal rises to K2*Vin, the switch transistor S11 is turned off so that the charge capacitor is discharged and the ramp signal drops to a starting value such as Vcm, where the ramp signal being a sawtooth signal is taken as an example, however, in an alternative embodiment, the ramp signal may also be a triangular wave signal.

In an example, the PWM control circuit is configured to compare the ramp signal with a sum of the second compensation signal and a proportional signal, to generate a PWM control signal for controlling switching operations of the main power switch transistor, wherein the proportional signal is proportional to the input voltage or/and the output voltage, where each of the input voltage and the output voltage may be represented as a signal representing the input voltage information or the output voltage information, and the signal representing the input voltage information or the output voltage information can be the input voltage or the output voltage itself or a representing signal proportional to the input voltage or the output voltage. In an alternative embodiment, the PWM control circuit is configured to compare the second compensation signal with a difference between the ramp signal and the proportional signal to generate the PWM control signal, which may achieve same effect. In this example, the proportional signal (e.g., K1*Vo)

is linearly proportional to the signal representing the output voltage, by a first proportion coefficient K1.

As shown in FIG. 2, the PWM control circuit may further include a signal processing circuit, which can be implemented by an adder that receives the second compensation signal Vca and the proportional signal to generate a processed signal Vca' by performing superposition processing, and the PWM signal generation circuit is configured to receive the processed signal and the ramp signal to generate the PWM control signal. The PWM signal generation circuit may be implemented by a PWM comparator. At each beginning of clock cycles of a clock signal, the PWM signal jumps to an active state (high voltage level state), the main power switch transistor is turned on, and the ramp signal Vs rises from an initial voltage. When the ramp signal reaches the processed signal Vca' which is obtained by performing superposition processing, the PWM signal jumps to an inactive state (low voltage level state), the main power switch transistor is turned off, and the main power switch transistor is turned on, thus a time period during which the ramp signal rises to the processed signal from the initial voltage is a turn-on period of the main power switching transistor.

It should be understood that, for a buck power conversion circuit, Formula (1) for the turn-on period Ton is:

$$Ton = (Vo/Vin) * T \qquad (1)$$

where T represents a switching cycle time.

According to the above-mentioned circuit structure, Formula (2) for the processed signal Vca' is:

$$Vca' = \qquad (2)$$
$$(K2 * Vin/RC) * Ton = (K2 * Vin/RC) * ((Vo/Vin) * T) = K2 * Vo/RC * T$$

where RC is a time constant of the ramp generation circuit.

And Formula (3) for the processed signal Vca' is:

$$Vca' = K1 * Vo + Vc \qquad (3)$$

where Vc can be regarded as a voltage close to zero.

According to Formula (2) and Formula (3), it can be known that by setting K1 and K2 reasonably, such as setting K1=K2/RC*T, the switching duty cycle of the system can be adjusted with the input voltage or the output voltage.

Figure 4A:
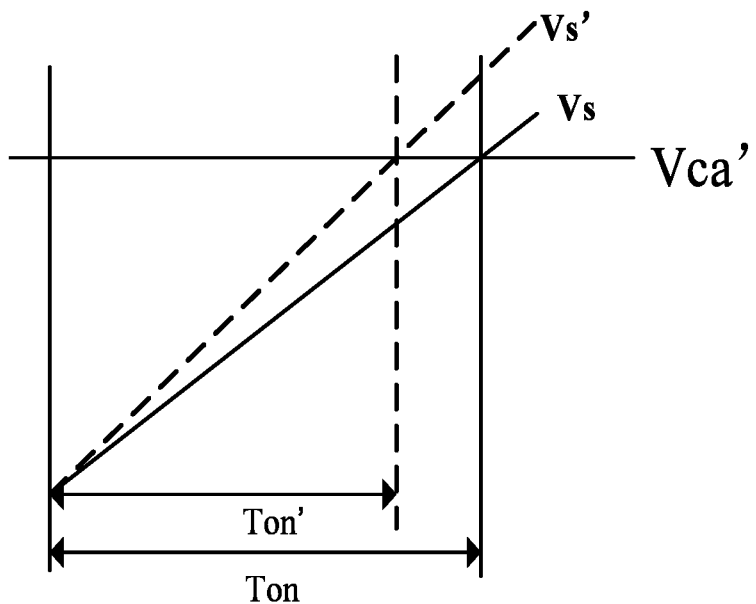
FIG. 4a is a first operation waveform diagram according to FIG. 1.
Figure 4B:
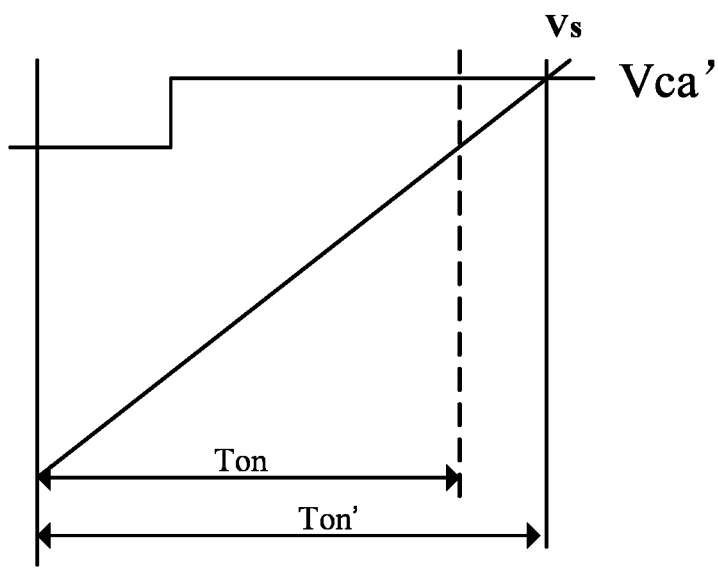
FIG. 4b is a second operation waveform diagram according to FIG. 1.

As shown in FIG. 4a, when the input voltage changes, the slope of the ramp signal Vs changes. For example, if the input voltage becomes larger, the slope of the ramp signal Vs becomes larger, and the time period for the ramp signal to reach the processed signal from the initial voltage becomes shorter, the turn-on period becomes shorter and may be changed from Ton to Ton', thus the system loop can respond to a change of the input voltage in real time. As shown in FIG. 4b, when the output voltage changes, for example, when the output voltage becomes larger, a voltage value of the processed signal Vca' increases, the time period for the ramp signal to reach the processed signal from the initial voltage becomes longer, the turn-on period becomes longer and may be changed from Ton to Ton', thus the system loop can respond to a change of the output voltage in real time.

For a buck power conversion circuit, the proportional signal may also be set in linear proportional relation to a difference between the signal representing the input voltage and the signal representing the output voltage, by a first proportion coefficient, i.e., K1*(Vin−Vo), then the processed signal Vca' can be: Vca'=Vca+K1*(Vin−Vo).

According to the buck topology, Formula (4) for a turn-off period Toff can be:

$$Toff = ((Vin - Vo)/Vin) * T \qquad (4)$$

where T represents a switching cycle time.

According to the above-mentioned circuit structure, Formula (5) for the processed signal Vca' can be:

$$Vca' = (K2 * Vin/RC) * Toff = (K2 * Vin/RC) * ((Vin - Vo)/Vin) * T) = \qquad (5)$$
$$K2 * (Vin - Vo)/RC * T$$

where Vc can be regarded as a voltage close to zero, therefore Formula (6) can be:

$$K1 * (Vin - Vo) = K2 * (Vin - Vo)/RC * T \qquad (6)$$

It can be known from Formula (5) and Formula (6) that, by setting the values of K1 and K2 reasonably, the switching duty cycle of the system can be adjusted according to the input voltage or the output voltage, and an adjustment process is similar to the adjustment process mentioned above.

Figure 5:
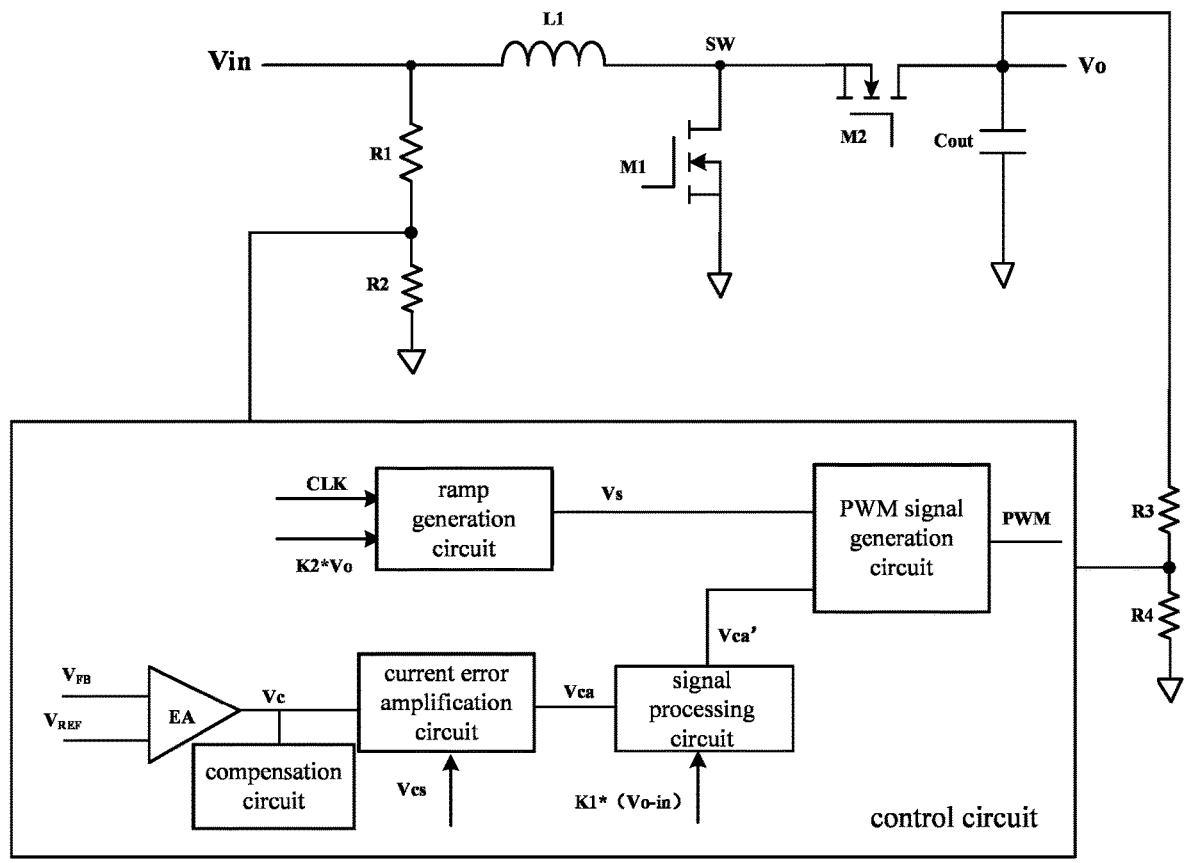
FIG. 5 is a circuit block diagram of a power conversion circuit according to a second embodiment of the present disclosure.

Referring to FIG. 5, a circuit block diagram of a power conversion circuit according to a second embodiment of the present disclosure is shown. In this embodiment, the power conversion circuit may be a boost power conversion circuit comprising a switch transistor M1, a switch transistor M2 and an inductor L1, an input terminal of the power conversion circuit receives an input voltage Vin, and an output terminal of the power conversion circuit generates an output voltage Vo for driving a load.

The specific circuit structure of the control circuit in this embodiment is similar to that of the previous embodiment, except that: the slope of the ramp signal is linearly proportional to a signal representing the output voltage, by a second proportion coefficient, i.e., Vs=K2*Vo, and an amplitude of the ramp signal is a product of the second proportion coefficient and the signal representing the output voltage; the proportional signal is linearly proportional to a difference between the signal representing the output voltage and the signal representing the input voltage, by a first proportion coefficient, then the processed signal Vca' can be: Vca'=Vca+K1*(Vo−Vin).

According to the boost power conversion circuit, Formula (7) for a turn-on period Ton can be:

$$Ton = ((Vo - Vin)/Vo) * T \qquad (7)$$

where T represents a switching cycle time.

According to the above-mentioned circuit structure, Formula (8) for the processed signal Vca' can be:

$$Vca' = (K2*Vo/RC)*Ton = \qquad (8)$$
$$(K2*Vo/RC)*((Vo-Vin)/Vo)*T = K2*(Vo-Vin)/RC*T$$

where Vc can be regarded as a voltage close to zero, therefore:

$$K1*(Vo-Vin) = K2*(Vo-Vin)/RC*T \qquad (9)$$

It can be known from the Formula (8) and Formula (9) that, by setting the values of K1 and K2 reasonably, the switching duty cycle of the system can be adjusted with the input voltage or the output voltage. For example, when the input voltage changes, the processed signal Vca' changes accordingly, and a time period for the ramp signal rising to the processed signal changes, so that the turn-on period of the main power switch transistor changes, the output voltage can be quickly adjusted, and dynamic response is fast. For example, when the output voltage changes, the slope of the ramp signal changes accordingly, and similarly, the turn-on period of the main power switch transistor changes, so that the output voltage can be quickly adjusted. It should be known to those skilled in the art that, in a boost topology, relationships among the ramp signal, the proportional signal, and the input/output can also be set in other ways, for example, the proportional signal may be linearly proportional to the signal representing the input voltage, which may achieve a same technical effect.

Figure 6:
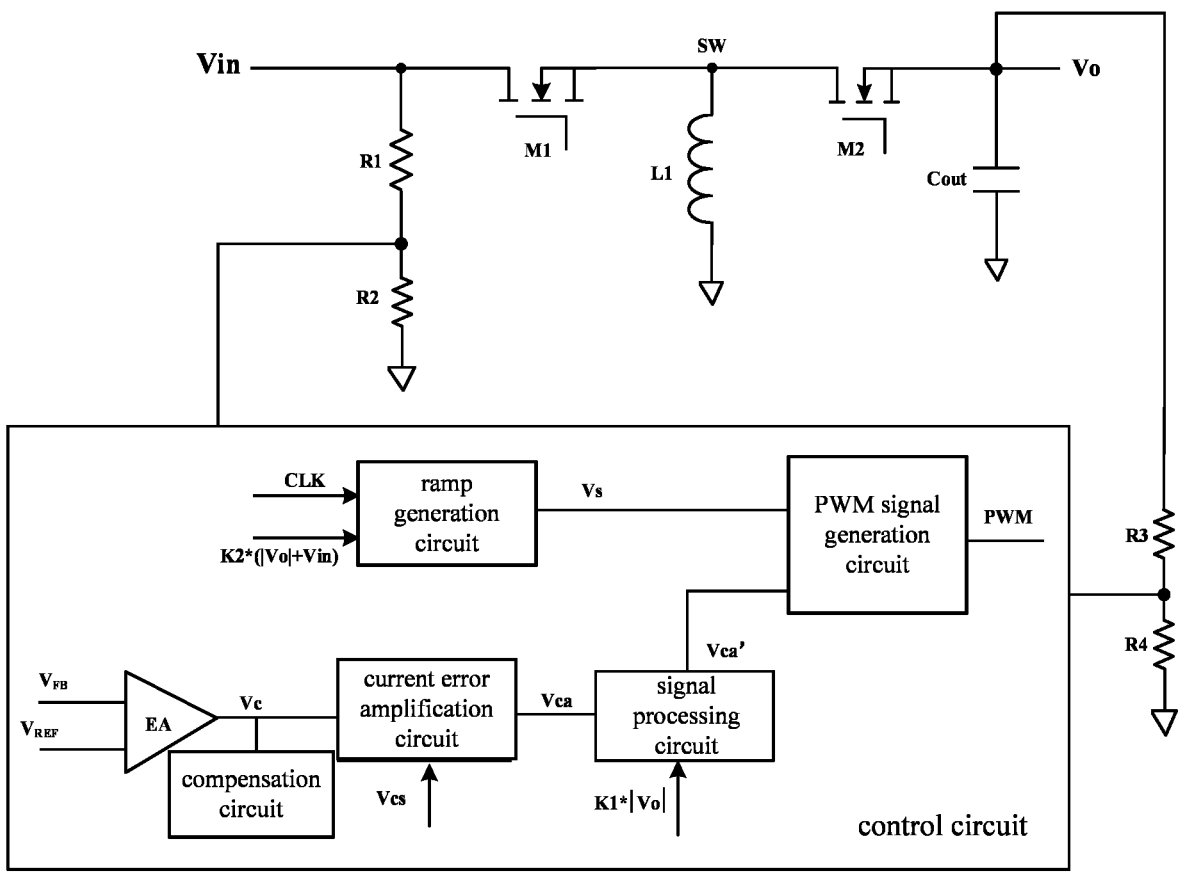
FIG. 6 is a circuit block diagram of a power conversion circuit according to a third embodiment of the present disclosure.

Referring to FIG. 6, a circuit block diagram of a power conversion circuit according to a third embodiment of the present disclosure is shown. In this embodiment, the power conversion circuit may be a buck-boost power conversion circuit comprising a switch transistor M1, a switch transistor M2 and an inductor L1, an input terminal of the power conversion circuit receives an input voltage Vin, and an output terminal of the power conversion circuit generates an output voltage Vo for driving a load.

The specific circuit structure of the control circuit in this embodiment is similar to that of the first embodiment, except that: the ramp signal is linearly proportional to a sum of an absolute value of a signal representing the output voltage and a signal representing the input voltage, by a second proportion coefficient, i.e., Vs=K2*(|Vo|+Vin), and an amplitude of the ramp signal is a product of the second proportion coefficient and a sum of the absolute value of the signal representing the output voltage and the signal representing the input voltage; the proportional signal is linearly proportional to the absolute value of the signal representing the output voltage, by a first proportion coefficient, i.e., K1*|Vo|, therefore the processed signal Vca' can be: Vca'=Vca+K1*|Vo|.

According to the buck-boost power conversion circuit, Formula (10) for a turn-on period Ton can be:

$$Ton = (|Vo|/(|Vo|+Vin)*T \qquad (10)$$

where T represents a switching cycle time.

According to the above-mentioned circuit structure, Formula (11) for the processed signal Vca' can be:

$$Vca' = (K2*(|Vo|+Vin)/RC)*Ton = \qquad (11)$$
$$(K2*(|Vo|+Vin)/RC)*(|Vo|/(|Vo|+Vin))*T = K2*|Vo|/RC*T$$

where Vc can be regarded as a voltage close to zero, therefore:

$$K1*|Vo| = K2*|Vo|/RC*T \qquad (12)$$

It can be known from Formula (11) and Formula (12) that, by setting the values of K1 and K2 reasonably, the switching duty cycle of the system can be adjusted according to the input voltage or the output voltage, and an adjustment process is similar to the adjustment process mentioned above. It should be known to those skilled in the art that, in the buck-boost topology, the relationships among the ramp signal, the proportional signal, and the input/output can also be set in other ways, for example, the proportional signal may be linearly proportional to the signal representing the input voltage, which may achieve a same technical effect.

According to some embodiments of the present disclosure, the power conversion circuit can obtain a first compensation signal according to difference information between an output feedback signal of the power conversion circuit and a preset reference signal, obtain a second compensation signal according to difference information between the first compensation signal and a first current signal representing current information of a power loop, and generate a PWM control signal according to the second compensation signal, a ramp signal and a proportional signal associated with an input/output voltage. The PWM control signal is used to control switching operations of a switch transistor in the power conversion circuit, so that the system can be quickly adjusted with a transient change of the input voltage or the output signal. Through this technical proposal, output voltage information or/and input voltage information can be fed back to a control loop, so that variation information of the output voltage and the input voltage can be quickly reflected by the PWM control signal, thus the system can quickly obtain a switch duty cycle which allows the system to operate in a state close to steady, thereby controlling the output voltage to be stable and dynamic response speed of the system to be fast. According to this technical proposal, a transient change of a signal in the circuit can be quickly transmitted to the duty cycle through a voltage feedback loop and a current feedback loop, so that the output signal, such as an output current, can be quickly adjusted, and a circuit designed according to this application can simplify the compensation design of the error amplifier, and different current feedback information can be adopted in different circuit topologies, so that stability of system control is good.

In a technical field of LED driving technology, switching power supply is often used to drive LED to achieve light emitting. By an integrated control circuit, switching operations of a switch transistor in a switching power supply can be controlled, thus the switching power supply can provide an operating voltage and an operating current for an LED.

In some applications with LED lamp string, which is, for example, used as vehicle lamp, brightness adjustment of the vehicle lamp is realized by adjusting the number of LED to be turned on/off in the LED lamp string, but a change of the number of LED to be turned on/off may easily cause current fluctuation on a current flowing through the LED lamp string, or, a transient change of the input voltage or output voltage of the switching power supply may also easily cause current fluctuation on the current flowing through the LED lamp string. Therefore, it is expected to propose a solution that can quickly adjust the current flowing through the LED lamp string, so that when the number of LED lamp string is changed or fluctuation occurs on the input signal and output signal, the voltage or current signal for driving LED can respond quickly, and the current for driving LED can basically remain constant, so as to meet an operation requirement on rapidly achieving a stable state.

The power conversion circuit provided by any of the embodiments of the present disclosure can be used to realize the switching power supply for driving LED, so as to solve a technical problem that an LED current is easy to fluctuate in the prior art.

Figure 7:
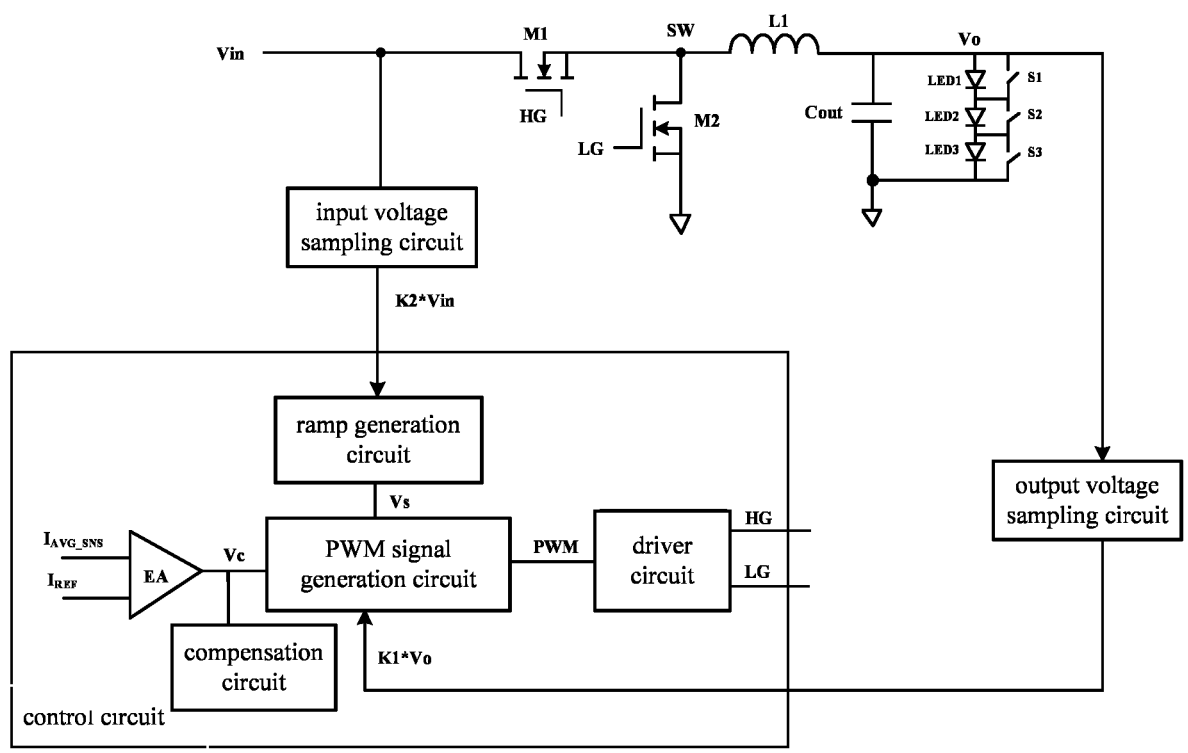
FIG. 7 is a circuit block diagram of a switching power supply according to an embodiment of the present disclosure.
Figure 8:
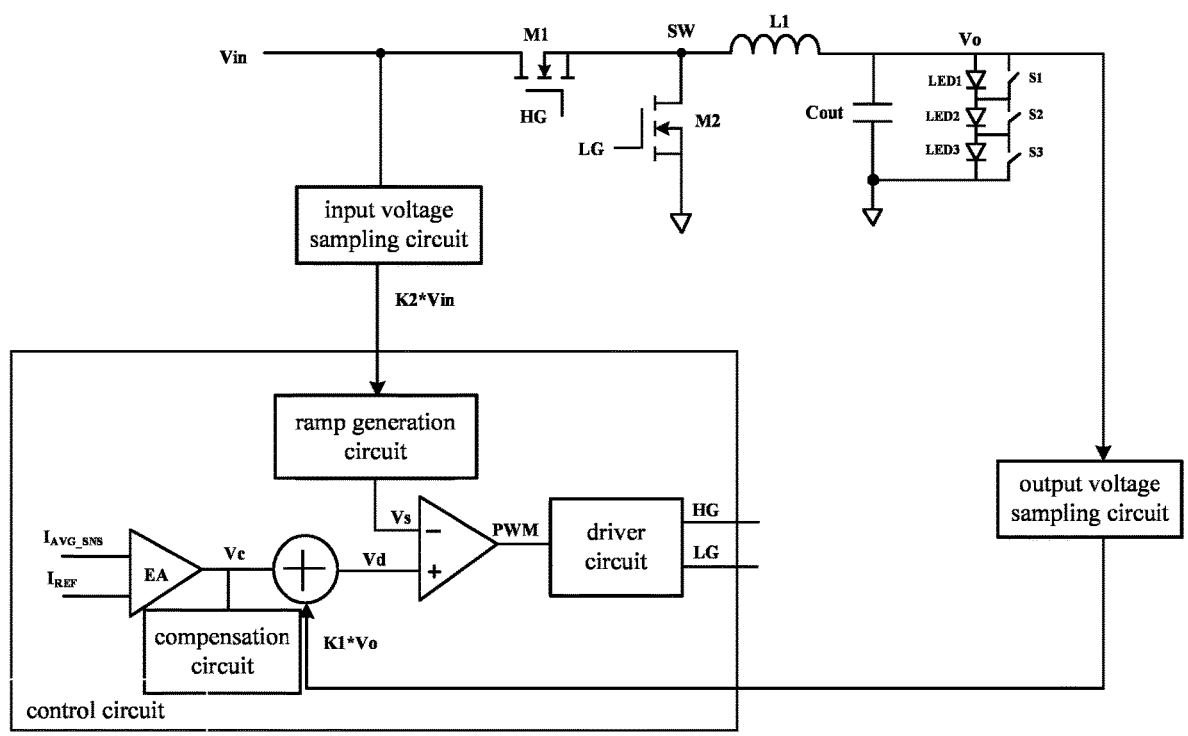
FIG. 8 is a circuit block diagram of a switching power supply according to a first embodiment of the present disclosure.
Figure 10:
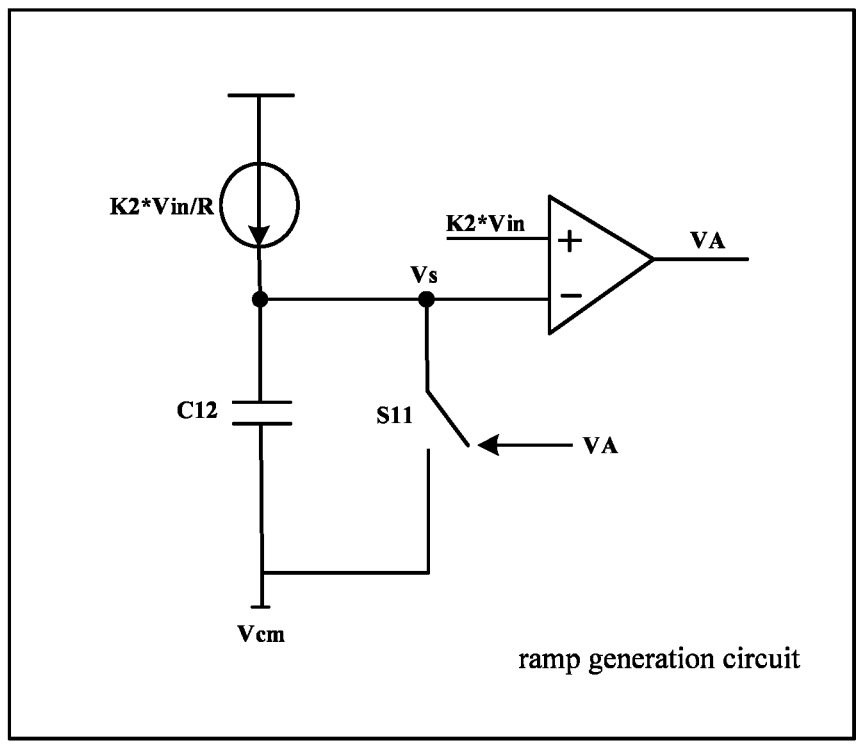
FIG. 10 is a schematic circuit diagram of the ramp generation circuit according to FIG. 8.

Referring to FIG. 7, a circuit block diagram of a switching power supply according to an embodiment of the present disclosure is shown; referring to FIG. 8, a circuit block diagram of a switching power supply according to an embodiment of the present disclosure is shown, and FIG. 10 is a schematic circuit diagram of a ramp generation circuit according to FIG. 8. As shown in FIGS. 7 and 8, the switching power supply may be a buck switching power supply comprising a switch transistor M1, a switch transistor M2 and an inductor L1, an input terminal of the switching power supply receives an input power supply Vin, and an output terminal of the switching power supply provides an output voltage Vo for driving an LED load. In this embodiment, the LED load comprises a lamp string composed of a plurality of LED lamps, and the plurality of LED lamps are controlled to be turned on/off by a switch that is connected in parallel or/and in series with the plurality of LED lamps, as an example, switches S1, S2 and S3 are each configured to control a corresponding LED lamp to be turned on/off. The switching power supply in this embodiment comprises a power stage circuit and a control circuit, wherein the power stage circuit comprises a main power switch transistor (such as M1), a freewheeling switch transistor (such as M2) and an inductor L1, and the control circuit is configured to control switching operations of the main power switch transistor M1 and the freewheeling switch transistor M2, so as to obtain an output voltage and an output current which are expected for driving the LED load.

In this embodiment, the control circuit includes a sampling circuit, an error amplification circuit and a PWM control circuit. The sampling circuit is configured to sample an input voltage Vin and an output voltage Vo of the switching power supply to obtain a ramp signal Vs, which is proportional to the input voltage, and a first proportional voltage signal, which is proportional to the output voltage, and denoted as K1*Vo. A slope of the ramp signal Vs is linearly proportional to the input voltage, by a second proportion coefficient K2. In a preferred embodiment, the first proportion coefficient and the second proportion coefficient are equal, and in some alternative embodiments, the first proportion coefficient and the second proportion coefficient may be slightly different from each other in value.

Figure 9:
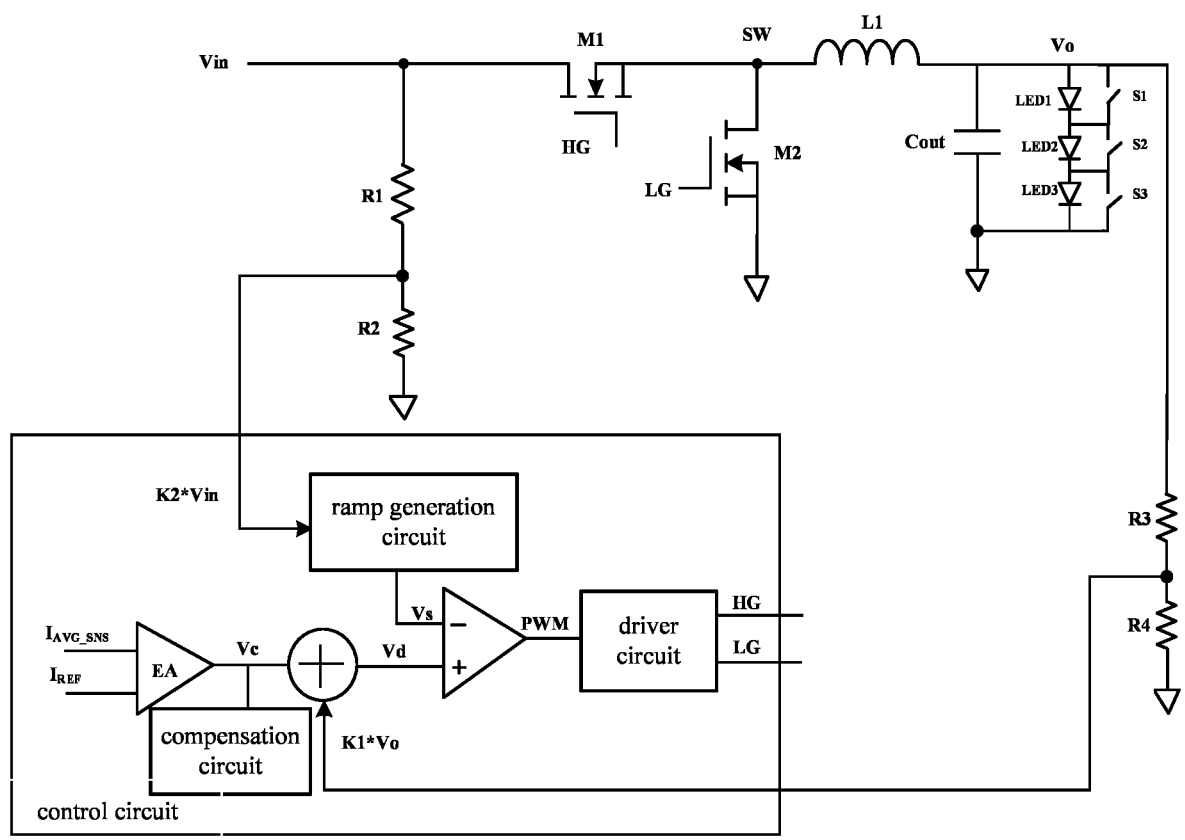
FIG. 9 is a schematic circuit diagram of the sampling circuit according to FIG. 8.

Referring to FIG. 9, a schematic circuit diagram of the sampling circuit in FIG. 8 is shown, and the sampling circuit may comprise an input voltage sampling circuit and an output voltage sampling circuit. The input voltage sampling circuit may include a sampling resistor R1 and a resistor R2, the output voltage sampling circuit may include a sampling resistor R3 and a resistor R4, the input voltage sampling circuit is connected to an input terminal of the switching power supply, the output voltage sampling circuit is connected to an output terminal of the switching power supply, the first proportion coefficient and the second proportion coefficient may be set according to resistance values of the resistors R1, R2, R3 and R4.

Further referring to FIGS. 7 and 8, the PWM control circuit comprises a ramp generation circuit and a PWM signal generation circuit. The ramp generation circuit is configured to generate a ramp signal according to the second proportion coefficient, an amplitude of the ramp signal is equal to a product of the second proportion coefficient and the input voltage, i.e., K2*Vin. The PWM signal generation circuit is configured to receive the ramp signal, the error compensation signal and the first proportional voltage signal (serving as the proportional signal) to obtain the PWM control signal, where the PWM signal generation circuit may be a comparison circuit. In some preferred embodiments, the PWM signal generation circuit is configured to compare the ramp signal with a sum of the error compensation signal and the first proportional voltage signal to generate the PWM control signal; or the PWM signal generation circuit is configured to compare the error compensation signal with a difference between the ramp signal and the first proportional voltage signal to generate the PWM control signal, which is illustrated as an example in FIG. 8. The effects of the two kinds of configurations may be the same.

In some embodiments of the present disclosure, the ramp signal is a sawtooth wave signal or a triangular wave signal. Referring to FIG. 10, an embodiment of the ramp signal generation circuit is shown. The ramp signal can be obtained by charging a charge capacitor with a charging current which is proportional to the input voltage, for example, the charging current is K2*Vin/R, the ramp signal proportional to the input voltage can be obtained by charging and discharging the capacitor C12 with the charging current. Taking a sawtooth signal as an example of the ramp signal, when a voltage of the capacitor C12 rises to a voltage amplitude K2*Vin, the switch S11 is turned off and the capacitor C12 is discharged.

Referring to FIGS. 7 and 8, the error amplification circuit receives a preset reference current and an inductor current sampled signal of the switching power supply, wherein the preset reference current is a desired operating current which is set according to the LED load, and the error amplification circuit can obtain the error compensation signal according to the preset reference current and the inductor current sampled signal. In the embodiment, the inductor current sampled signal in this embodiment is a sampled signal representing an average value of the current through the inductor and can be obtained by sampling the current flowing through the inductor or by sampling an LED current. By using the sampled signal representing the average value of the current through the inductor, the error amplifier can be well adjusted by a compensation circuit such as a RC compensation circuit, and an adjustment amplitude is not very large, making it easy to operate.

In some preferred embodiments, the PWM control circuit is configured to generate the PWM control signal according to the error compensation signal, the ramp signal and the first proportional voltage signal, and the PWM control signal is used for controlling switching operations of the power switch transistor, so as to obtain a stable output signal. Specifically, when the error compensation signal reaches the difference between the ramp signal and the first proportional voltage signal, or when the sum of the error compensation signal and the first proportional voltage signal reaches the ramp signal, the PWM control signal is used to control the power switch transistor to turn off. Taking FIG. 2 as an example, the PWM signal generation circuit may include a superposition circuit and a comparison circuit, wherein the superposition circuit is configured to receive the error compensation signal and the first proportional voltage signal, and the comparison circuit is configured to receive an output signal of the superposition circuit and the ramp signal, and generate the PWM control signal by comparing the output signal of the superposition circuit with the ramp signal. In some alternative embodiments, the PWM signal generation circuit may include a subtraction circuit and a comparison circuit, and an operating principle may be the same as described above.

Figure 11:
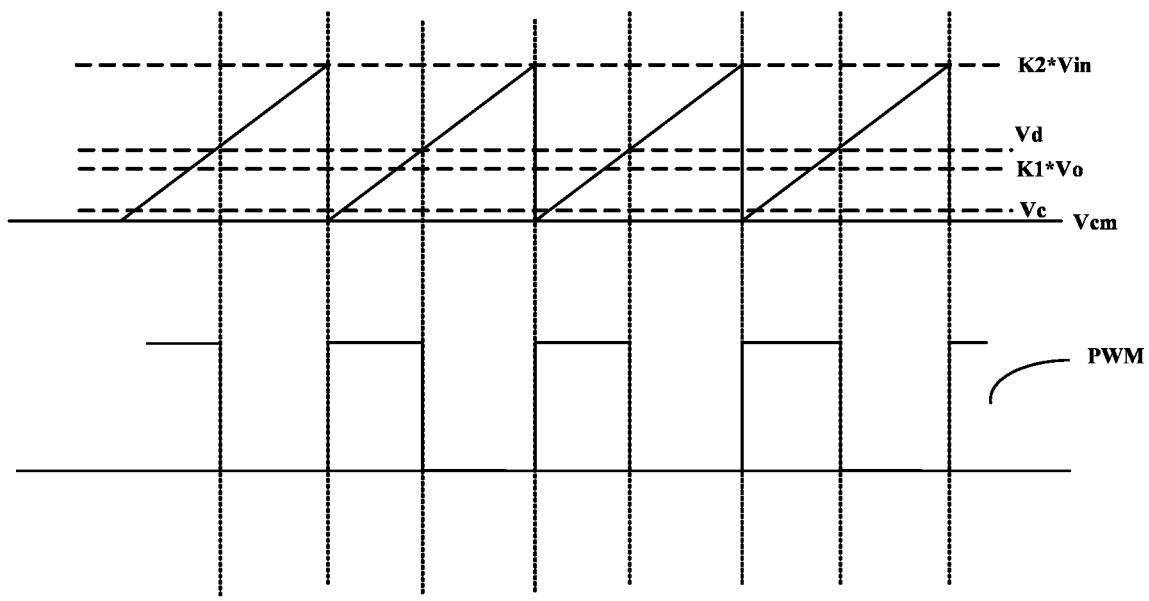
FIG. 11 is a waveform diagram according to FIG. 8.

Referring to FIG. 11, a waveform diagram according to FIG. 8 is shown, wherein Vc represents the error compensation signal of the error amplifier, and a superposed signal Vd can be obtained by performing superposition on the error compensation signal Vc and the first proportional voltage signal K1*Vo, which is proportional to the output voltage, the ramp signal rises by an amplitude K2*Vin, the ramp signal is compared with the superposed signal, when the ramp signal rises to the superposed signal, the PWM control signal becomes low-voltage level, and the main power switch transistor is controlled to be turned off, and when the PWM control signal is in high-voltage level, the main power switch transistor is turned on, and a rising edge of the PWM control signal can be realized according to a clock signal. Thus, according to the above-mentioned manner, a duty cycle associated with both the input voltage and the output voltage can be obtained.

According to some embodiments of the present disclosure, the duty cycle of the switching power supply is regulated according to the ramp signal and the first proportional voltage signal, the ramp signal is proportional to the input voltage, and the first proportional voltage signal is proportional to the output voltage. Thus, it can be inferred that, according to these of the present disclosure, the duty cycle is inversely proportional to the input voltage and is directly proportional to the output voltage, that is, a formula which expresses a duty cycle of a buck switching power supply can be realized. According to the embodiments of the present disclosure, information of the input voltage and the output voltage can be skillfully introduced into a control loop, and an outer loop is controlled by a current loop according to an average current, so as to achieve a purpose of improving dynamic response speed and performing stable control of the system. When the load of the switching power supply is an LED load, because of the certainty of a voltage drop of the LED load itself, the output voltage can be accurately determined when the number of LED in the load is changed, so that the output voltage can be more accurately fed back during loop control, thus realizing accurate control and good performance.

According to embodiments of the present disclosure, in a switching power supply, a compensation signal is compared with a difference between a proportional signal representing input voltage information and a proportional signal representing output voltage information, to generate a PWM control signal, wherein the PWM control signal is used to control a switching operation of a switch transistor in the switching power supply, thus making an output current of the switching power supply basically stable, and the compensation signal represents a difference between a preset reference current and an average inductor current signal of the switching power supply. According to the technical proposal of the present disclosure, in a process of changing the number of LED in the load, the information of the output voltage and the input voltage is fed back to the control loop, so that variation information of the input voltage and the output voltage can be quickly reflected by the PWM control signal, thus the system can quickly obtain a switching duty cycle which allows the system to operate in a state close to steady, thereby the inductor current can become stable rapidly, the output current can be stable and dynamic response speed of the system can be fast.

The above-mentioned embodiments do not limit the protection scope of the present invention. Any modification, equivalent replacement and improvement made within the spirit and principles of the above embodiments shall be included in the protection scope of the present invention.

The invention claimed is:

1. A power conversion circuit for quick response, wherein an input terminal of the power conversion circuit is configured to receive an input voltage, an output terminal of the power conversion circuit is connected to a load, and the power conversion circuit comprises:
   a power stage circuit, comprising a main power switch transistor, a freewheeling switch transistor and an inductor;
   a control circuit, comprising an error amplification circuit and a PWM control circuit, wherein the error amplification circuit is configured to obtain an error compensation signal according to a sampled signal, the sampled signal represents an output feedback signal of the power conversion circuit or represents an average value of a current through the inductor,
   wherein the PWM control circuit is configured to generate a PWM control signal according to the error compensation signal, a ramp signal and a proportional signal, the PWM control signal is used for controlling a switching operation of the main power switch transistor, and the proportional signal is proportional to the input voltage or/and an output voltage of the power stage circuit,
   wherein a slope of the ramp signal is determined according to the input voltage and/or the output voltage of the power stage circuit,
   wherein the sampled signal represents the output feedback signal of the power conversion circuit, the error amplification circuit is configured to: obtain a first compensation signal according to difference information between the sampled signal and a preset reference signal, and obtain a second compensation signal according to difference information between the first compensation signal and a first current signal representing power loop current information, and the second compensation signal is provided to the PWM control circuit as the error compensation signal,
   wherein the PWM control circuit is configured to compare the ramp signal with a sum of the second compensation signal and the proportional signal, to generate the PWM control signal, or the PWM control circuit is configured to compare the second compensation signal with a difference between the ramp signal and the proportional signal, to generate the PWM control signal.

2. The power conversion circuit according to claim 1, wherein the PWM control circuit comprises:

a ramp generation circuit, configured to obtain the ramp signal according to input voltage information or/and output voltage information of the power stage circuit;

a signal processing circuit, configured to receive the second compensation signal and the proportional signal, and generate a processed signal by performing superposition processing on the second compensation signal and the proportional signal; and a PWM signal generation circuit, configured to receive the processed signal and the ramp signal and generate the PWM control signal according to the processed signal and the ramp signal.

3. The power conversion circuit according to claim 1, wherein the first current signal is a signal representing the current through the inductor of the power stage circuit or a load current of the power stage circuit.

4. The power conversion circuit according to claim 1, wherein the ramp signal is a sawtooth wave signal or a triangular wave signal.

5. The power conversion circuit according to claim 1, wherein, when a buck power stage circuit is formed by use of the main power switch transistor, the freewheeling switch transistor, and the inductor, the slope of the ramp signal is linearly proportional to a signal representing the input voltage, by a second proportion coefficient;

the proportional signal is linearly proportional to a signal representing the output voltage, by a first proportion coefficient; or the proportional signal is linearly proportional to a difference between the signal representing the input voltage and the signal representing the output voltage, by a first proportion coefficient.

6. The power conversion circuit according to claim 5, wherein an amplitude of the ramp signal is a product of the second proportion coefficient and the signal representing the input voltage.

7. The power conversion circuit according to claim 1, wherein, when a boost power stage circuit is formed by use of the main power switch transistor, the freewheeling switch transistor, and the inductor, the slope of the ramp signal is linearly proportional to a signal representing the output voltage, by a second proportion coefficient, and the amplitude of the ramp signal is a product of the second proportion coefficient and the signal representing the output voltage;

the proportional signal is linearly proportional to a difference between the signal representing the output voltage and a signal representing the input voltage, or the proportional signal is linearly proportional to the signal representing the input voltage, by a first proportion coefficient.

8. The power conversion circuit according to claim 1, wherein, when a buck-boost power stage circuit is formed by use of the main power switch transistor, the freewheeling switch transistor, and the inductor, the slope of the ramp signal is linearly proportional to a sum of an absolute value of a signal representing the output voltage and a signal representing the input voltage, by a second proportion coefficient, and the amplitude of the ramp signal is a product of the second proportion coefficient and a sum of the absolute value of the signal representing the output voltage and the signal representing the input voltage;

the proportional signal is linearly proportional to the absolute value of the signal representing the output voltage or to the signal representing the input voltage, by a first proportion coefficient.

9. The power conversion circuit according to claim 1, wherein a signal representing the output voltage is obtained by sampling a feedback signal of the output voltage or by sampling a preset reference signal.

10. The power conversion circuit according to claim 1, wherein the ramp signal is obtained by charging a charge capacitor with a charging current, the charging current is associated with input voltage information or/and output voltage information of the power stage circuit.

11. The power conversion circuit according to claim 1, wherein the slope of the ramp signal is linearly proportional to a signal representing the input voltage, the output voltage, or a calculation result according to the input voltage and the output voltage.

12. A switching power supply for driving an LED, comprising a power conversion circuit for quick response, wherein an input terminal of the power conversion circuit is configured to receive an input voltage, an output terminal of the power conversion circuit is connected to a load, and the power conversion circuit comprises:

a power stage circuit, comprising a main power switch transistor, a freewheeling switch transistor and an inductor;

a control circuit, comprising an error amplification circuit and a PWM control circuit, wherein the error amplification circuit is configured to obtain an error compensation signal according to a sampled signal, the sampled signal represents an output feedback signal of the power conversion circuit or represents an average value of a current through the inductor, wherein the PWM control circuit is configured to generate a PWM control signal according to the error compensation signal, a ramp signal and a proportional signal, the PWM control signal is used for controlling a switching operation of the main power switch transistor, and the proportional signal is proportional to the input voltage or/and an output voltage of the power stage circuit, wherein the control circuit further comprises a sampling circuit, configured to sample the output voltage of the power stage circuit to obtain a first proportional voltage signal, which is provided to the PWM control circuit as the proportional signal, wherein the first proportional voltage signal is proportional to the output voltage by a first proportion coefficient;

the sampled signal represents an average value of a current through the inductor, and the error amplification circuit is configured to obtain the error compensation signal according to the sampled signal and a preset reference current.

13. The switching power supply according to claim 12, wherein the PWM control signal is used to control the power switch transistor to be turned off when the error compensation signal reaches a difference between the ramp signal and the first proportional voltage signal, or when a sum of the error compensation signal and the first proportional voltage signal reaches the ramp signal.

14. The switching power supply according to claim 12, wherein the sampled signal is obtained by sampling the current through the inductor or by sampling a load current of the power conversion circuit.

15. The switching power supply according to claim 12, wherein a slope of the ramp signal is linearly proportional to the input voltage, by a second proportion coefficient.

16. The switching power supply according to claim 15, wherein the first proportion coefficient is equal to the second proportion coefficient.

17. The switching power supply according to claim 15, wherein the sampling circuit is configured to sample the input voltage of the power stage circuit to obtain a second proportional voltage signal which is proportional to the input voltage, and the PWM control circuit comprises:
   a ramp generation circuit, configured to generate the ramp signal according to the second proportional voltage signal, wherein an amplitude of the ramp signal is a product of the second proportion coefficient and the input voltage; and
   a PWM signal generation circuit, configured to provide the PWM control signal according to the ramp signal.

18. The switching power supply according to claim 17, wherein the PWM signal generation circuit is configured to compare the ramp signal with a sum of the error compensation signal and the first proportional voltage signal to generate the PWM control signal, or
   the PWM signal generation circuit is configured to compare the error compensation signal with a difference between the ramp signal and the first proportional voltage signal to generate the PWM control signal.

19. The switching power supply according to claim 12, wherein the load comprises a lamp string composed of a plurality of LED lamps, and the power conversion circuit is configured to control the plurality of LED lamps to be turned on/off through a switch connected in parallel or/and in series with a corresponding one of the plurality of LED lamps.

* * * * *